(12) United States Patent
Lyons et al.

(10) Patent No.: US 7,960,480 B2
(45) Date of Patent: Jun. 14, 2011

(54) PROCESS FOR COAGULATING FLUOROELASTOMERS

(75) Inventors: Donald F. Lyons, Wilmington, DE (US);
Steven R. Oriani, Landenberg, PA (US)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 559 days.

(21) Appl. No.: 12/079,104

(22) Filed: Mar. 25, 2008

(65) Prior Publication Data

US 2008/0293891 A1 Nov. 27, 2008

Related U.S. Application Data

(60) Provisional application No. 60/931,035, filed on May 21, 2007.

(51) Int. Cl.
*C08F 14/22* (2006.01)
*C08F 14/26* (2006.01)

(52) U.S. Cl. ..................... 525/326.2; 524/500
(58) Field of Classification Search ............... 525/326.2; 524/500
See application file for complete search history.

(56) References Cited

U.S. PATENT DOCUMENTS

| | | | |
|---|---|---|---|
| 3,598,794 A | 8/1971 | Nerasian | |
| 3,795,655 A * | 3/1974 | Le Claire et al. | ............... 524/87 |
| 3,997,705 A | 12/1976 | Trautvetter et al. | |
| 4,001,486 A | 1/1977 | Phillips | |
| 4,214,060 A | 7/1980 | Apotheker et al. | |
| 4,281,092 A | 7/1981 | Breazeale | |
| 2005/0096425 A1 | 5/2005 | Coates et al. | |
| 2005/0143523 A1 | 6/2005 | Van Gool et al. | |
| 2006/0078754 A1 * | 4/2006 | Murakami et al. | ............ 428/532 |

FOREIGN PATENT DOCUMENTS

| | | | |
|---|---|---|---|
| EP | 0597359 A | | 5/1994 |
| EP | 597359 A1 * | | 5/1994 |
| GB | 1256373 | * | 12/1971 |
| GB | 1256373 A | | 12/1971 |
| WO | WO-2008/144070 A1 * | | 11/2008 |

OTHER PUBLICATIONS

R. V. Lauzon and D. D. Schmidt, Coagulation of a Carboxylated Latex with Polyethylenimine, Journal of Applied Polymer Science, 1974, pp. 3319-3327, Vol 18, John Wiley & Sons, Inc., USA.*
U.S. Appl. No. 12/009,270, Lyons.
R. V. Lauzon and D. D. Schmidt, Coagulation of a Carboxylated Latex with Polyethylenimine, Journal of Applied Polymer Science, 1974, pp. 3319-3327, vol. 18, John Wiley & Sons, Inc., USA.
Anestis L. Logothetis, Chemistry of Fluorocarbon Elastomers, Prog. Polym. Sci., 1989, pp. 251-296, vol. 14, Pergamon Press plc, Great Britain.

* cited by examiner

*Primary Examiner* — Peter D. Mulcahy
*Assistant Examiner* — Henry Hu

(57) ABSTRACT

In a process for the manufacture of fluoroelastomers, a water-soluble polymeric coagulant is employed that is an aqueous solution of polyethyleneimine or its copolymers.

4 Claims, No Drawings

PROCESS FOR COAGULATING FLUOROELASTOMERS

CROSS-REFERENCE TO RELATED APPLICATIONS

This application claims the benefit of U.S. Provisional Application No. 60/931,035, filed May 21, 2007.

FIELD OF THE INVENTION

This invention pertains to a novel process for the coagulation of fluoroelastomers wherein a certain class of water-soluble polymers is employed as the coagulating agent, more particularly wherein the class of water-soluble polymers includes polyethyleneimine and copolymers of polyethyleneimine.

BACKGROUND OF THE INVENTION

Elastomeric copolymers of vinylidene fluoride having excellent heat resistance, oil resistance, and chemical resistance have been used widely for sealing materials, containers and hoses.

Production of such fluoroelastomers by emulsion polymerization methods is well known in the art; see for example U.S. Pat. Nos. 4,214,060 and 4,281,092. The result of the polymerization is a dispersion or latex of the polymer. Generally, fluoroelastomers are then separated from the dispersion by addition of a coagulant to form a slurry. The slurry is then washed and dried and then shaped into final form for commercial use.

Coagulants heretofore employed are typically salts of inorganic multivalent cations, A. L. Logothetis, *Prog. Polym. Sci.* 14, 251-296 (1989). These include aluminum salts such as aluminum sulfate, alums such as potassium aluminum sulfate, calcium salts such as calcium chloride and calcium nitrate, and magnesium salts such as magnesium chloride and magnesium nitrate. While these salts work very well as coagulants, residual amounts of these salts remain in the polymer. The presence of these salts renders these polymers unsuitable for use in contamination-sensitive applications such as seals in semiconductor manufacture. Thus, it would be desirable to find other coagulants effective for use in the emulsion polymerization of fluoroelastomers.

Salts of univalent cations, such as sodium chloride, have been proposed as coagulating agents for the manufacture of fluoroelastomers. Residual amounts of these salts are considered relatively innocuous in some end use applications. However, excessively large amounts of salts of univalent cations are required to fully coagulate the fluoroelastomer. The resulting polymer is difficult to fully dry In addition, the large amounts of these salts that are needed to coagulate the polymer require large and expensive water treatment facilities.

The use of organic coagulants is another method to avoid polymer contamination. Residual amounts of organic coagulants will not contaminate semiconductor processes and in any case may volatilize out of the polymer during the curing process. U.S. Pat. No. 3,598,794 discloses polyamines as coagulants for fluoroelastomers. Addition of a polyamine to a fluoroelastomer dispersion forms a gel that can be separated from the aqueous phase. Washing of this gel, however, is difficult and residual polyamine that remains in the fluoroelastomer interferes in the curing operation.

U.S. Pat. No. 3,997,705 discloses coagulation of a fluoroelastomer with an organic base or salt that acts as a vulcanization accelerator. However, the use of such a coagulant results in a fluoroelastomer that is subject to premature cure or scorch. In addition, the use of such a coagulant restricts the options for subsequent compounding of the fluoroelastomer, since an accelerator is already present in the polymer as received by the customer.

Perfluoroelastomers have been coagulated with organo onium compounds (US 2005/0143523). However, the presence of residual organo onium compounds in the resulting elastomer gum can cause premature vulcanization (i.e. scorch), making processing difficult.

Copending U.S. Patent Application 60/900,264 (filed Feb. 8, 2007) discloses fluoroelastomer coagulants that are water-soluble polymers having at least two quaternary onium centers per polymer chain.

SUMMARY OF THE INVENTION

Surprisingly, it has been found that certain polyamines may be used to coagulate fluoroelastomers without resulting in a gel and without causing the elastomers to cure prematurely. One aspect of the present invention provides a coagulation process for the production of fluoroelastomers, said fluoroelastomers having at least 53 weight percent fluorine, comprising:

(A) providing an aqueous dispersion comprising a fluoroelastomer, said fluoroelastomer comprising copolymerized units of at least two copolymerizable monomers wherein a first monomer is present in an amount between 25 and 70 weight percent, based on total weight of said fluoroelastomer, said first monomer selected from the group consisting of vinylidene fluoride and tetrafluoroethylene; and (B) adding to said aqueous dispersion a water-soluble coagulant polymer selected from the group consisting of polyethyleneimine and copolymers of polyethyleneimine thereby coagulating said fluoroelastomer.

DETAILED DESCRIPTION OF THE INVENTION

The present invention is directed to a coagulation process for producing a fluoroelastomer gum or crumb. By "fluoroelastomer" is meant an amorphous elastomeric fluoropolymer. The fluoropolymer may be partially fluorinated or perfluorinated, so long as it contains at least 53 percent by weight fluorine, preferably at least 64 wt. % fluorine. Fluoroelastomers that may be employed in the process of this invention contain between 25 to 70 weight percent, based on the weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluorine-containing olefins, fluorine-containing vinyl ethers, hydrocarbon olefins and mixtures thereof.

Fluorine-containing olefins copolymerizable with the first monomer include, but are not limited to, vinylidene fluoride, hexafluoropropylene (HFP), tetrafluoroethylene (TFE), 1,2, 3,3,3-pentafluoropropene (1-HPFP), chlorotrifluoroethylene (CTFE) and vinyl fluoride.

Fluorine-containing vinyl ethers copolymerizable with the first monomer include, but are not limited to perfluoro(alkyl vinyl)ethers. Perfluoro(alkyl vinyl)ethers (PAVE) suitable for use as monomers include those of the formula $$CF_2=CFO(R_f\!O)_n(R_f\!'O)_mR_f\!'' \qquad (I)$$

where $R_f$ and $R_{f''}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl)ethers includes compositions of the formula $$CF_2=CFO(CF_2CFXO)_nR_f \qquad (II)$$

where X is F or $CF_3$, n is 0-5, and $R_f$ is a perfluoroalkyl group of 1-6 carbon atoms.

A most preferred class of perfluoro(alkyl vinyl)ethers includes those ethers wherein n is 0 or 1 and $R_f$ contains 1-3 carbon atoms. Examples of such perfluorinated ethers include perfluoro(methyl vinyl)ether (PMVE) and perfluoro(propyl vinyl)ether (PPVE). Other useful monomers include compounds of the formula $$CF_2=CFO[(CF_2)_mCF_2CFZO]_nR_f \qquad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl)ether monomers include compounds of the formula $$CF_2=CFO[(CF_2CF\{CF_3\}O)_n(CF_2CF_2CF_2O)_m(CF_2)_p]C_xF_{2x+1} \qquad (IV)$$

where m and n independently=0-10, p=0-3, and x=1-5.

Preferred members of this class include compounds where n=0-1, m=0-1, and x=1.

Other examples of useful perfluoro(alkyl vinyl ethers) include $$CF_2=CFOCF_2CF(CF_3)O(CF_2O)_mC_nF_{2n+1} \qquad (V)$$

where n=1-5, m=1-3, and where, preferably, n=1.

If copolymerized units of PAVE are present in fluoroelastomers employed in this invention, the PAVE content generally ranges from 25 to 75 weight percent, based on the total weight of the fluoroelastomer. If perfluoro(methyl vinyl)ether is used, then the fluoroelastomer preferably contains between 30 and 55 wt. % copolymerized PMVE units.

Hydrocarbon olefins useful in the fluoroelastomers employed in this invention include, but are not limited to ethylene (E) and propylene (P). If copolymerized units of a hydrocarbon olefin are present in the fluoroelastomers, hydrocarbon olefin content is generally 4 to 30 weight percent The fluoroelastomers employed in the coagulation process of the present invention may also, optionally, comprise units of one or more cure site monomers. Examples of suitable cure site monomers include: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl) ether; and ix) non-conjugated dienes.

Brominated cure site monomers may contain other halogens, preferably fluorine. Examples of brominated olefin cure site monomers are $CF_2=CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br-R_f-O-CF=CF_2$ ($R_f$ is a perfluoroalkylene group), such as $CF_2BrCF_2O-CF=CF_2$, and fluorovinyl ethers of the class $ROCF=CFBr$ or $ROCBr=CF_2$ (where R is a lower alkyl group or fluoroalkyl group) such as $CH_3OCF=CFBr$ or $CF_3CH_2OCF=CFBr$.

Suitable iodinated cure site monomers include iodinated olefins of the formula: $CHR=CH-Z-CH_2CHR-I$, wherein R is $-H$ or $-CH_3$; Z is a $C_1-C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1(ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perflubrovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Useful nitrile-containing cure site monomers include those of the formulas shown below.

$$CF_2=CF-O(CF_2)_n-CN \qquad (VI)$$

where n=2-12, preferably 2-6;

$$CF_2=CF-O[CF_2-CF(CF_3)-O]_n-CF_2-CF(CF_3)-CN \qquad (VII)$$

where n=0-4, preferably 0-2;

$$CF_2=CF-[OCF_2CF(CF_3)]_x-O-(CF_2)_n-CN \qquad (VIII)$$

where x=1-2, and n=1-4; and $$CF_2=CF-O-(CF_2)_n-O-CF(CF_3)CN \qquad (IX)$$

where n=2-4. Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \qquad (X)$$

i.e. perfluoro(8-cyano-5-methyl-3,6-dioxa-1-octene) or 8-CNVE. Nitrile-containing cure site monomers are particularly useful in copolymers also containing tetrafluoroethylene and perfluoro(methyl vinyl ether).

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Patent 2,067,891 and European Patent 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and 8-CNVE. When the fluoroelastomer will be cured with a polyol, 2-HPFP or perfluoro(2-phenoxypropyl vinyl)ether is the preferred cure site monomer. When the fluoroelastomer will be cured with a tetraamine, bis(aminophenol) or bis(thioaminophenol), 8-CNVE is the preferred cure site monomer.

Units of cure site monomer, when present in the fluoroelastomers employed in the coagulation process of this invention, are typically present at a level of 0.05-10 wt. % (based on the total weight of fluoroelastomer), preferably 0.05-5 wt. % and most preferably between 0.05 and 3 wt. %.

Specific fluoroelastomers which may be employed in the process of this invention include, but are not limited to those having at least 58 wt. % fluorine and comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl)ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl)ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl)ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl)ether and 4-iodo-3,3,4,4-tetrafluorobutene-1; and xvi) tetrafluoroethylene, perfluoro(methyl vinyl)ether and perfluoro(2-phenoxypropyl vinyl) ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707,529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

Fluoroelastomers that may be employed in the coagulation process of this invention are typically made in an emulsion polymerization process of this invention may be a continuous, semi-batch or batch process.

In a semi-batch emulsion polymerization process, a gaseous monomer mixture of a desired composition (initial monomer charge) is introduced into a reactor which contains an aqueous solution. The aqueous solution may optionally contain a surfactant. The reactor is typically not completely filled with the aqueous solution, so that a vapor space remains. Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7, depending upon the type of fluoroelastomer being prepared. Alternatively, or additionally, pH buffer or base may be added to the reactor at various times throughout the polymerization reaction, either alone or in combination with other ingredients such as polymerization initiator, liquid cure site monomer, additional surfactant or chain transfer agent. Also optionally, the initial aqueous solution may contain a water-soluble inorganic peroxide polymerization initiator. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of a first monomer of either TFE or $VF_2$ and one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.-130° C., preferably 50° C.-120° C. Polymerization begins when the initiator either thermally decomposes or reacts with reducing agent and the resulting radicals react with dispersed monomer.

Additional quantities of the gaseous monomers and optional cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoroelastomer. Thus, the incremental feed contains between 25 to 70 weight percent, based on the total weight of the monomer mixture, of a first monomer of either TFE or $VF_2$ and 75 to 30 weight percent of one or more additional monomers that are different from the first monomer. Chain transfer agent may also, optionally, be introduced into the reactor at any point during this stage of the polymerization. Typically, additional polymerization initiator is also fed to the reactor during this stage of polymerization. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. Polymerization times in the range of from 2 to 30 hours are typically employed in this semi-batch polymerization process.

A continuous emulsion polymerization process for manufacture of fluoroelastomers differs from the semi-batch process in the following manner. The reactor is completely filled with aqueous solution so that there is no vapor space. Gaseous monomers and solutions of other ingredients such as water-soluble monomers, chain transfer agents, buffer, bases, polymerization initiator, surfactant, etc., are fed to the reactor in separate streams at a constant rate. Feed rates are controlled so that the average polymer residence time in the reactor is generally between 0.2 to 4 hours. Short residence times are employed for reactive monomers, whereas less reactive monomers such as perfluoro(alkyl vinyl) ethers require more time. The temperature of the continuous process reaction mixture is maintained in the range of 25° C.-130° C., preferably 80° C.-120° C. Also, fluoroelastomer latex particles are more readily formed in the continuous process so that a nucleating agent is not typically required in order to start the polymerization reaction.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. In a continuous process, pressure is adjusted by a back-pressure regulator in the dispersion effluent line. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoroelastomer copolymer formed is approximately equal to the amount of incremental feed charged, and is in the range of 10-30 parts by weight of copolymer per 100 parts by weight of aqueous medium, preferably in the range of 20-25 parts by weight of the copolymer. The degree of copolymer formation is set in the above range because if it is less than 10 parts by weight, productivity is undesirably low, while if it is above 30 parts by weight, the solids content becomes too high for satisfactory stirring.

Water-soluble peroxides which may be used to initiate polymerization in this invention include, for example, the ammonium, sodium or potassium salts of hydrogen persulfate. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Surfactants, typically anionic surfactants, are optionally employed in these processes. Examples of surfactants include, but are not limited to perfluorooctanoic acid (and its salts), sodium octyl sulfonate, and perfluorohexylethylsulfonic acid (and its salts). However, surfactant is not necessarily required.

Fluoroelastomer gum or crumb is isolated from the fluoroelastomer dispersions by the addition of a water-soluble polymeric coagulating agent to the dispersion. This coagulating agent comprises a homopolymer or copolymer of ethyleneimine (CH2CH2NH—). Copolymers include small amounts of branching agents such as ethylenediamine. The weight average molecular weight (Mw), determined by light scattering, of the coagulant can vary between 600 and 2,000,000. The polyethyleneimine is added to the dispersion as an aqueous solution. This solution can be used as prepared, or acidified to reduce its pH. Acidification can be accomplished using common acids including, but not limited to sulfuric, nitric, hydrochloric, hydrobromic, acetic, or phosphoric acids. One skilled in the art will readily recognize that other acids may be used as well. The pH of the coagulant solution has a minimum value of 2.0, most preferably 3.0. When the pH of the coagulant solution is reduced below 2.0, excessive amounts of coagulant are required to fully coagulate the polymer.

Optionally, the properties of fluoroelastomers coagulated by polyethyleneimine or a copolymer thereof can be enhanced by subjecting the polymer crumb to an elevated temperature, in the absence of any curatives. The heating process enables the polymer to cure more quickly after compounding with typical polyhydroxy or polyamine curatives known in the art. The polymer may be heated in a quiescent state (i.e. in the absence of shear), to at least 200° C. for one hour or longer. To avoid a cumbersome oven aging process, however, the polymer that has been coagulated with polyethyleneimine or copolymers thereof is preferably passed through an extruder to conduct the heat treatment. Preferably, the polymer temperature in the extruder reaches at least 150° C., more preferably the polymer temperature reaches at least 250° C. The extruder may be a single screw, twin screw, or Buss® kneader type. Preferably, the extruder is a twin screw extruder or Buss Kneader, and more preferably the extruder includes a vacuum devolatization section.

The fluoroelastomers prepared by the process of this invention are useful in many industrial applications including seals, wire coatings, tubing and laminates.

EXAMPLES

Test Methods

Mooney viscosity, ML (1+10), was determined according to ASTM D1646 with an L (large) type rotor at 121° C., using a preheating time of one minute and rotor operation time of 10 minutes.

Cure characteristics were measured on a Monsanto MDR 2000 Moving Disc Rheometer (MDR) according to ASTM D5289

The invention is further illustrated by, but is not limited to, the following examples.

Polyethyleneimine employed in the examples had a weight average molecular weight (Mw) of 2000 and a number average molecular weight (Mn) of 1800 (available from Aldrich as a 50 wt. % solution in water).

Example 1

A $VF_2$/HFP copolymer fluoroelastomer was prepared by a continuous emulsion polymerization process of the inventions, carried out at 115° C. in a well-stirred 2.0-liter stainless steel liquid full reaction vessel. An aqueous solution, consisting of 2.18 g/hour (g/h) ammonium persulfate initiator, 0.87 g/h sodium hydroxide, 1.88 g/h sodium octyl sulfonate, and 2.10 g/h isopropanol chain transfer agent in deionized water, was fed to the reactor at a rate of 5.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 769 g/h vinylidene fluoride ($VF_2$) and 575 g/h hexafluoropropylene (HFP) fed through a diaphragm compressor. After 2.0 hours, collection of the effluent dispersion was begun and collection continued for 7.0 hours. The effluent latex, which had a pH of 4.69 and contained 19.96 wt. % solids, was separated from residual monomers in a degassing vessel at atmospheric pressure.

Three 10.0 kg portions of latex were weighed out and then coagulated by dripping in an aqueous coagulant solution according to Table I. Sample 1 was coagulated according to the process of the invention. Control samples A and B were coagulated according to prior art processes.

TABLE I

| Sample | Coagulant | Grams coagulant required |
|---|---|---|
| 1 | 0.1 wt. % Polyethyleneimine acidified to pH 5 with nitric acid | 873 |
| A | 8.5 wt. % calcium nitrate tetrahydrate | 604 |
| B | 6.8 wt. % potassium aluminum sulfate | 562 |

Example 2

A $VF_2$/HFP/TFE copolymer fluoroelastomer was prepared by a continuous emulsion polymerization process of the invention, carried out at 110° C. in a well-stirred 2.0-liter stainless steel liquid full reaction vessel. An aqueous solution, consisting of 2.16 g/hour (g/h) ammonium persulfate initiator, 0.87 g/h sodium hydroxide, 1.31 g/h sodium octyl sulfonate, and 0.98 g/h isopropanol chain transfer agent in deionized water, was fed to the reactor at a rate of 5.0 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 395 g/h vinylidene fluoride ($VF_2$), 507 g/h hexafluoropropylene (HFP), and 309 g/h tetrafluoroethylene (TFE) fed through a diaphragm compressor. After 2.0 hours, collection of effluent dispersion was begun and collection continued for 5 hours. The effluent polymer latex, which had a pH of 2.67 and contained 18.5 wt. % solids, was separated from residual monomers in a degassing vessel at atmospheric pressure.

A coagulation process of the invention was utilized to isolate the fluoroelastomer. A coagulum was formed by adding to the polymer latex a 0.5 wt. % polyethyleneimine (PEI) solution that had been acidified to pH 5 with nitric acid at the ratio of 14 grams PEI solution to 1 kg latex. The aqueous phase was removed from the slurry and the resulting wet crumb was dried in an air oven at approximately 50°-65° C. to a moisture content of less than 1 wt. %. The product, comprised of 36 wt. % $VF_2$ units, 36.5 wt. % HFP units, and 27.5 wt. % TFE units, was an amorphous elastomer having a glass transition temperature of −7.3° C., as determined by differential scanning calorimetry (heating mode, 10° C./minute, inflection point of transition). Inherent viscosity of the elastomer was 0.47 dL/g, measured at 30° C. in methyl ethyl ketone, and Mooney viscosity, ML(1+10) at 121° C., was 55.5.

Example 3

A $VF_2$/PMVE/TFE copolymer fluoroelastomer was prepared by a continuous emulsion polymerization process, carried out at 105° C. in a well-stirred 2.0-liter stainless steel liquid full reaction vessel. An aqueous solution, consisting of 1.98 g/hour (g/h) ammonium persulfate initiator and 0.79 g/h sodium hydroxide, was fed to the reactor at a rate of 4 L/hour. The reactor was maintained at a liquid-full level at a pressure of 6.2 MPa by means of a backpressure control valve in the effluent line. After 30 minutes, polymerization was initiated by introduction of a gaseous monomer mixture consisting of 569 g/h vinylidene fluoride ($VF_2$), 393 g/h perfluoro(methyl vinyl ether) (PMVE), and 101 g/h tetrafluoroethylene (TFE), fed through a diaphragm compressor. Fifteen minutes after polymerization commenced, 4-bromo-3,3,4,4-tetrafluoro-1-butene (BTFB) was fed into the reactor at a rate of 10.0 g/h. After a further 1.75 hours, collection of effluent dispersion was begun and collection continued for 5 hours. The effluent polymer latex, which had a pH of 8.88 and contained 21.3 wt. % solids, was separated from residual monomers in a degassing vessel at atmospheric pressure.

A coagulation process of the invention was utilized to isolate the fluoroelastomer. A coagulum was formed by adding to the polymer latex a 0.5 wt. % polyethyleneimine solution that had been acidified to pH 5 with nitric acid at the ratio of 19 grams PEI solution to 1 kg latex. The aqueous phase was removed from the slurry and the resulting wet crumb was dried in an air oven at approximately 50°-65° C. to a moisture content of less than 1 wt. %. The product, comprised of 56.4 wt. % $VF_2$ units, 35.5 wt. % PMVE units, 6.5 wt. % TFE units, and 1.6 wt. % BTFB units, was an amorphous elastomer having a glass transition temperature of −31.7° C., as determined by differential scanning calorimetry (heating mode, 10° C./minute, inflection point of transition). Inherent viscosity of the elastomer was 1.35 dL/g, measured at 30° C. in methyl ethyl ketone, and Mooney viscosity, ML(1+10) at 121° C., was 168.5.

Example 4

The following example illustrates the optional heat treatment, prior to introduction of curative, of fluoroelastomer that has been coagulated with polyethyleneimine. The fluoroelastomer employed comprised copolymerized units of 60 wt. % $VF_2$, 36 wt. % HFP, and 4 wt. % TFE, and was coagulated with a polyethyleneimine solution that had been adjusted to pH 5 using nitric acid. The resulting crumb was dried in a hot air oven for 24 hours at 70° C. The crumb was then mechanically granulated and fed into a 28 mm co-rotating twin screw operating at conditions as shown below:

|  | Condition A | Condition B |
|---|---|---|
| Barrel set points |  |  |
| Zone 1 (feed) | 130° C. | 250° C. |
| Zone 2 | 130° C. | 250° C. |
| Zone 3 | 130° C. | 250° C. |
| Die (exit) | 130° C. | 250° C. |
| Screw speed | 100 rpm | 150 rpm |

-continued

|  | Condition A | Condition B |
|---|---|---|
| Vacuum devolatization | yes | yes |
| Polymer exit temperature | 150° C. | 260° C. |

Virgin crumb (i.e. not heat treated), extruded Polymer A (Condition A), and extruded Polymer B (Condition B) were then separately mill mixed to create bisphenol curable compositions 1, 2 and 3, respectively. The curable compositions are shown in TABLE II below.

The curable compositions were then tested for cure characteristics using a moving die rheometer, 3 degree arc, operating at 177° C. for a test time of 6 minutes. Cure data are also shown in TABLE II.

TABLE II

| Ingredient, phr[1] | Sample 1 | Sample 2 | Sample 3 |
|---|---|---|---|
| Virgin crumb | 100 | 0 | 0 |
| Extruded Polymer A | 0 | 100 | 0 |
| Extruded Polymer B | 0 | 0 | 100 |
| Viton ® Curative 50[2] | 2.5 | 2.5 | 2.5 |
| Calcium Hydroxide HP-XL[3] | 6 | 6 | 6 |
| Elastomag 170[4] | 3 | 3 | 3 |
| N990 Carbon Black[5] | 30 | 30 | 30 |
| Curing Characteristics |  |  |  |
| ML (dN-m)[6] | 0.72 | 0.66 | 0.67 |
| MH (dN-m)[7] | 20.96 | 22.58 | 22.08 |
| t'50 (minutes)[8] | 1.82 | 1.28 | 1.17 |
| t'90 (minutes)[9] | 2.68 | 1.95 | 1.72 |

[1]phr is parts by weight per hundred parts rubber (i.e. fluoroelastomer)
[2]a bisphenol AF based curative package also containing an accelerator (available from DuPont Performance Elastomers)
[3]Calcium hydroxide available from Marine Magnesium and Chemicals Co.
[4]Magnesium oxide available from Rohm & Haas Corp.
[5]Medium thermal black available from Cancarb Ltd.
[6]ML: minimum torque
[7]MH: maximum torque
[8]t'50: time from the start of the test to reach 50% torque rise between ML and MH
[9]t'90: time from the start of the test to reach 90% torque rise between ML and MH Both of the compositions containing heat treated fluoroelastomer (Samples 2 and 3) cured much faster than the virgin crumb (Sample 1), as evidenced by the shorter t'50 and t'90 times. In addition, Sample 3, based on the fluoroelastomer extruded at a polymer temperature of 260° C., cured slightly faster than did Sample 2 containing fluoroelastomer extruded at 150° C.

What is claimed is:

1. A coagulation process for the production of fluoroelastomers, said fluoroelastomers having at least 53 weight percent fluorine, comprising:
(A) providing an aqueous dispersion comprising a fluoroelastomer, said fluoroelastomer comprising copolymerized units selected from the group consisting of i) vinylidene fluoride and hexafluoropropylene; ii) vinylidene fluoride, hexafluoropropylene and tetrafluoromethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl)ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methy(vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro (methyl vinyl)ether and 4-bromo-3,3,4,4-tetrafluorobutene-1; xv) tetrafluoroethylene, perfluoro (methyl vinyl)ether and 4-iodo-3,3,4,4-tetrafluorobutene-1; and xvi) tetrafluoroethylene, perfluoro(methyl vinyl)ether and perfluoro(2-phenoxypropyl vinyl)ether;
(B) adding to said aqueous dispersion an aqueous solution of a water-soluble coagulant polymer selected from the group consisting of polyethyleneimine and copolymers of polyethyleneimine thereby coagulating said fluoroelastomer; and
(C) heat treating coagulated fluoroelastomer, in the absence of curative, at a temperature of at least 150° C. in an extruder.

2. A coagulation process according to claim 1 wherein said aqueous solution of water-soluble coagulant polymer has a pH of 2 or greater.

3. A coagulation process according to claim 2 wherein said aqueous solution of water-soluble coagulant polymer has a pH between 3 and 9.

4. A coagulation process according to claim 1 wherein said heat treating of coagulated fluoroelastomer, in the absence of curative, is at a temperature of at least 250° C. in an extruder.

* * * * *